United States Patent
Takakuwa et al.

(10) Patent No.: US 7,623,794 B2
(45) Date of Patent: Nov. 24, 2009

(54) WAVELENGTH DIVISION-MULTIPLEX SYSTEM

(75) Inventors: Makoto Takakuwa, Kawasaki (JP);
Futoshi Izumi, Kawasaki (JP);
Masahiro Yoshimoto, Kawasaki (JP);
Takahiro Hosokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 456 days.

(21) Appl. No.: 10/895,307

(22) Filed: Jul. 21, 2004

(65) Prior Publication Data

US 2005/0201755 A1  Sep. 15, 2005

(30) Foreign Application Priority Data

Mar. 9, 2004 (JP) .............................. 2004-065436

(51) Int. Cl.
H04B 10/00 (2006.01)

(52) U.S. Cl. ...................................... 398/171

(58) Field of Classification Search ................. 398/171, 398/102, 79

See application file for complete search history.

(56) References Cited

U.S. PATENT DOCUMENTS 4,782,434 A * 11/1988 Cole .......................... 362/252
5,805,322 A    9/1998 Tomofuji
6,862,133 B2   3/2005 Onaka et al.

FOREIGN PATENT DOCUMENTS

| JP | 52-107704 | 9/1977 |
|----|-----------|--------|
| JP | 63-48132 | 2/1988 |
| JP | 63-249827 | 10/1988 |
| JP | 4-111630 | 4/1992 |
| JP | 8-195733 | 7/1996 |
| JP | 10-145337 | 5/1998 |
| JP | 11-177496 | 7/1999 |
| JP | 11-341530 | 12/1999 |
| JP | 2003-218804 | 7/2003 |

OTHER PUBLICATIONS

Japanese Office Action issued on Mar. 3, 2009 in corresponding Japanese Patent Application 2004-65436.

* cited by examiner

Primary Examiner—Quan-Zhen Wang
(74) Attorney, Agent, or Firm—Staas & Halsey LLP

(57) ABSTRACT

A power-down delay unit for delaying cutoff of a voltage is provided in a power supply line which supplies electrical power to an optical module of a transponder unit for each optical wavelength. The power-down delay unit assigns different delays for each wavelength. The length of the delay is a time required by an AMP unit to change from an ALC mode to an AGC mode or longer. When the power sources for supplying electrical power to the transponder units becomes faulty and outputs of several wavelengths are simultaneously going to stop, the power-down delay unit delays cutoff of the supply voltage to the optical modules by keeping supply voltage for a while to the optical modules on behalf of power sources enabling the optical modules to operate after the power sources shutdown, so that the actual optical signals gradually stop one by one.

12 Claims, 16 Drawing Sheets

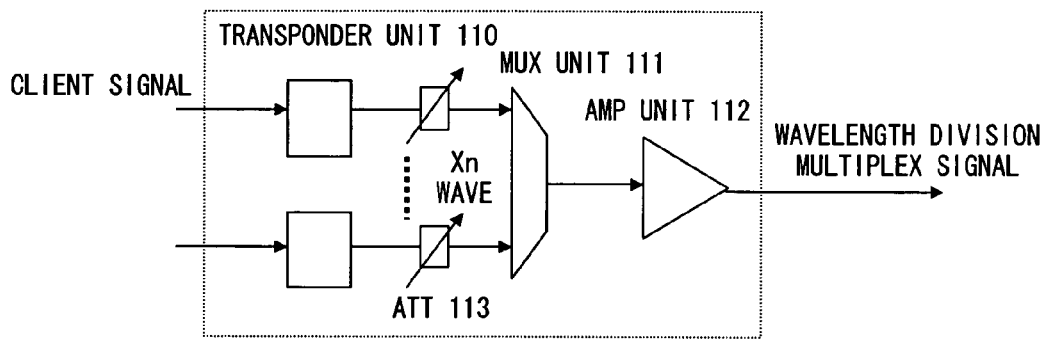
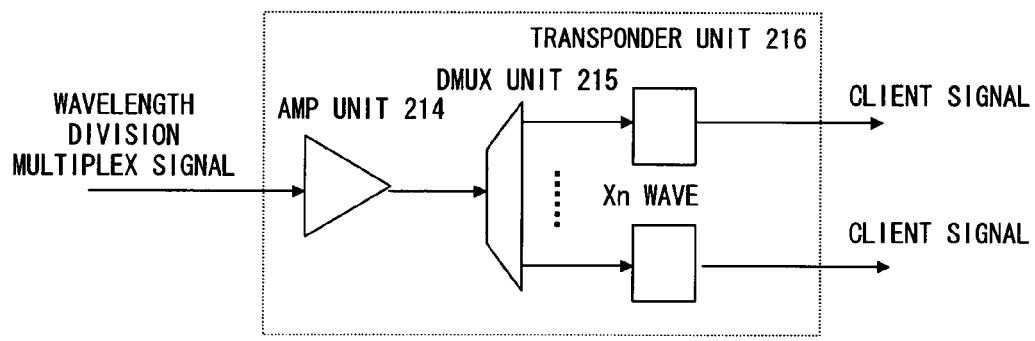
F I G. 1  PRIOR ART

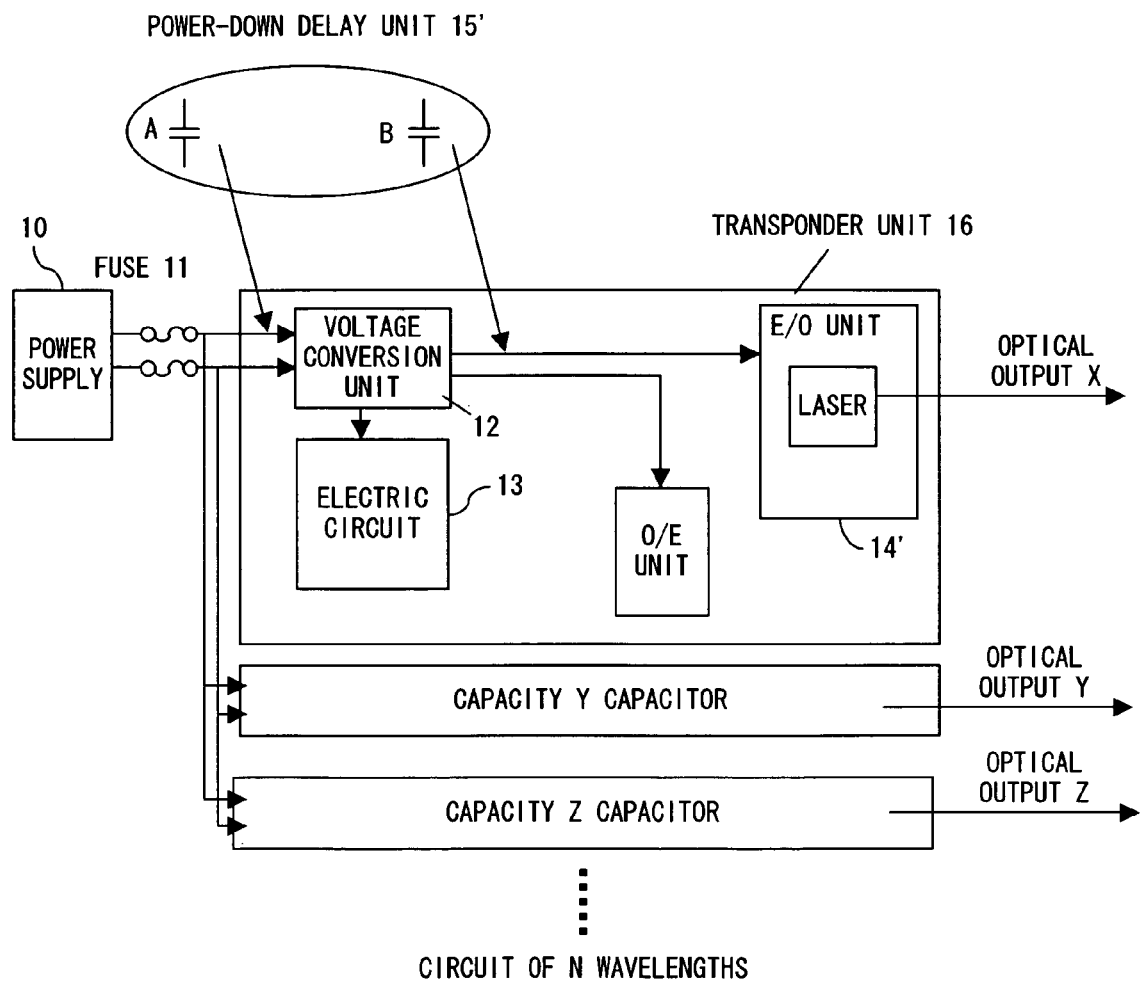
F I G. 6

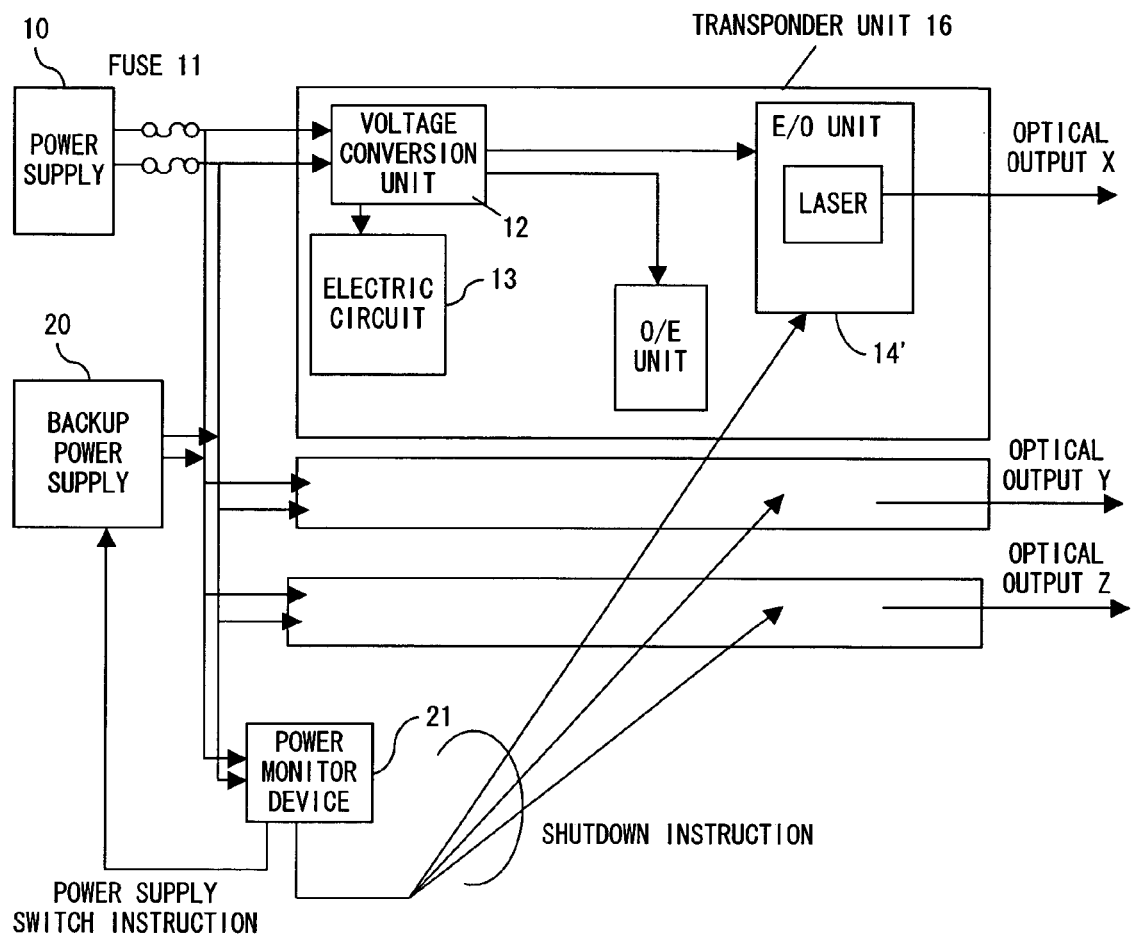
F I G. 7

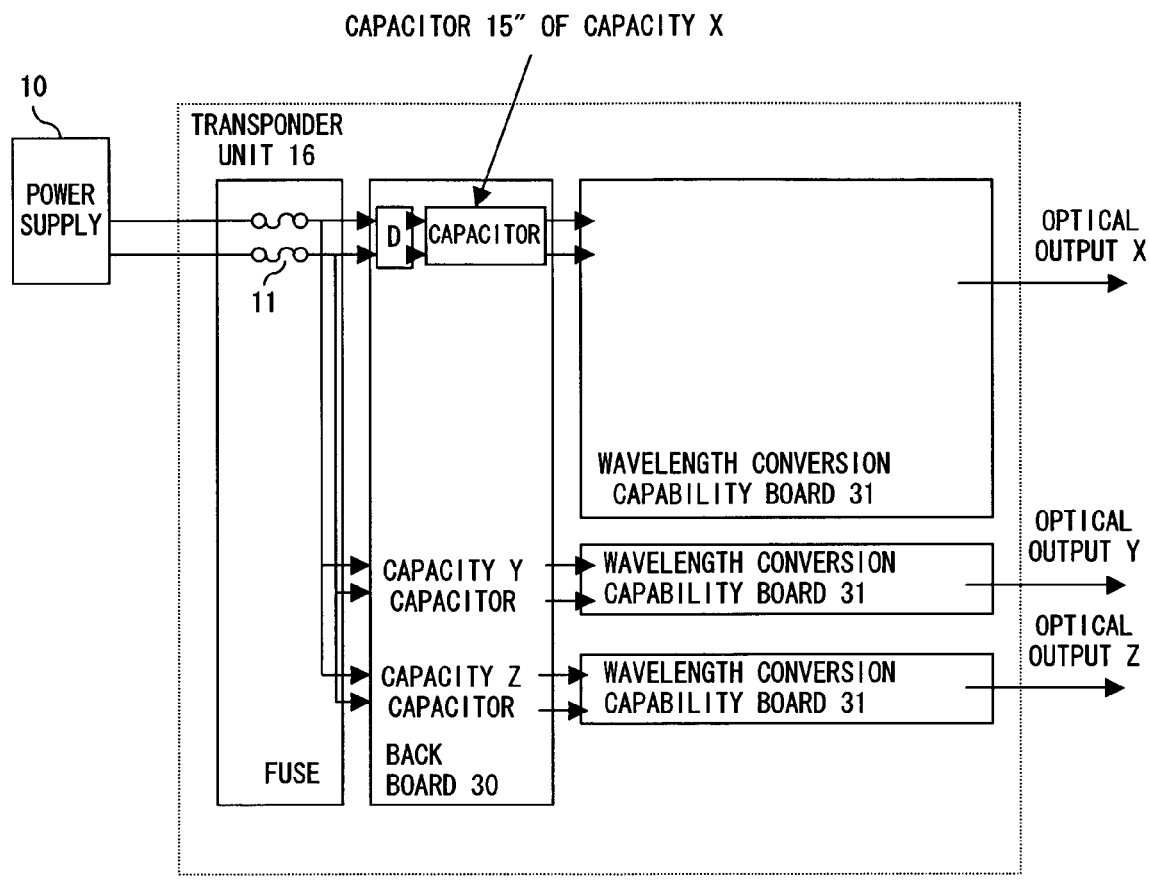
F I G. 1 0

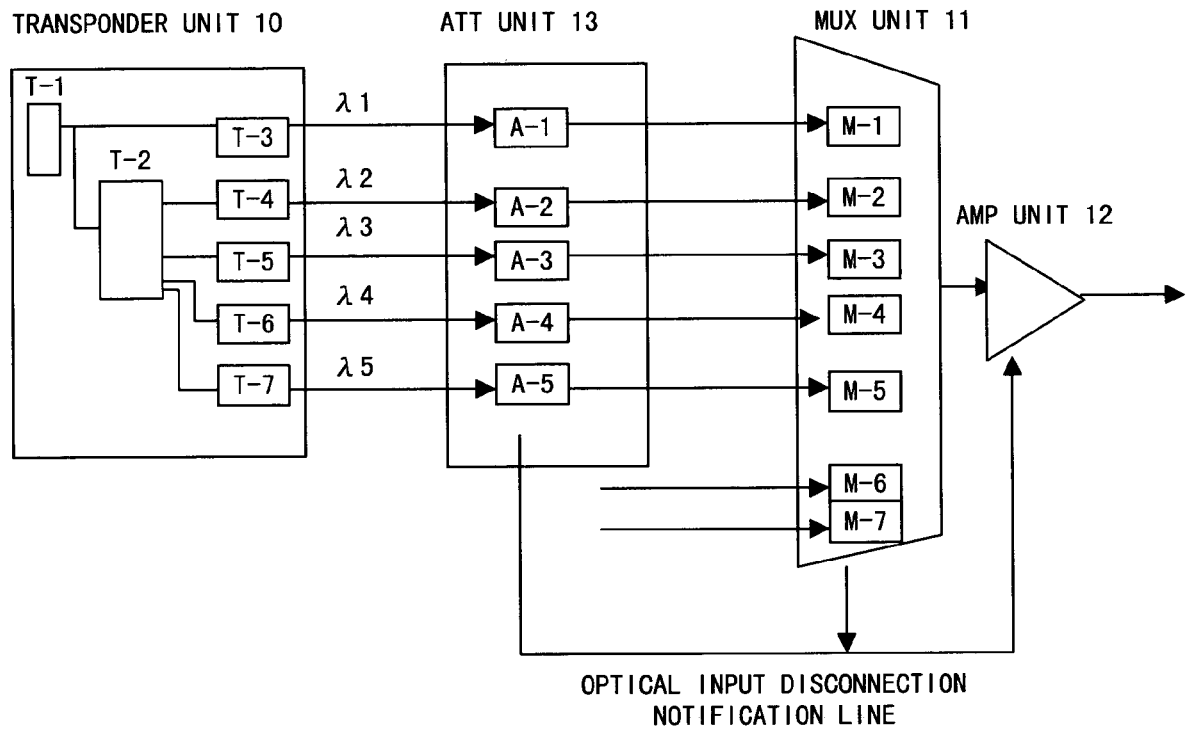
F I G. 1 5

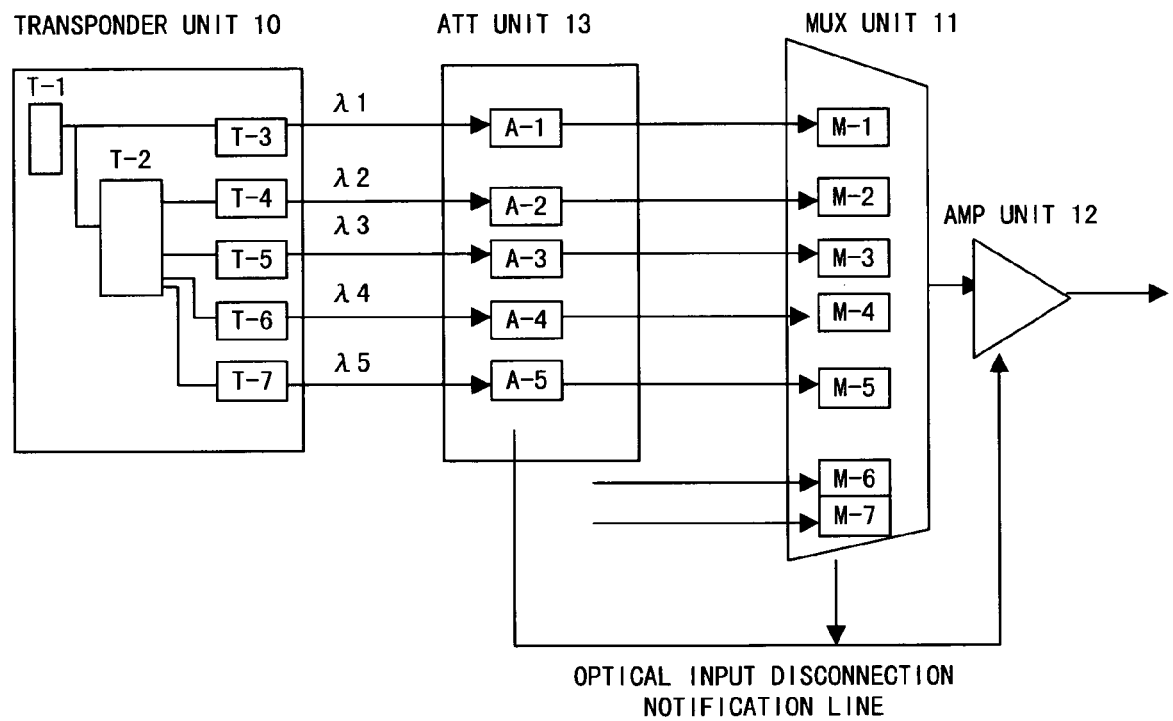
F I G. 1 6

WAVELENGTH DIVISION-MULTIPLEX SYSTEM

BACKGROUND OF THE INVENTION

1. Field of the Invention

The present invention relates to a wavelength division-multiplex system, and more specifically to a wavelength division-multiplex system having a capability of saving other wavelengths.

2. Description of the Related Art

Recently, a wavelength division-multiplex communications system (hereinafter referred to as a WDM system) has been widely used as a backbone circuit, and several years have passed since the WDM system was introduced. With an increasing circuit capacity, it has become essential to construct a WDM system free of the influence of the change in number of wavelengths multiplexed in the WDM system on the circuit containing residual wavelengths.

FIG. 1 shows the outline of the configuration of the transmission unit and the reception unit of the conventional WDM system.

A transmission unit 100 of the WDM system comprises a transponder unit (TRP unit) 110 for converting a signal of a client system into a format (an optical signal of a narrow band) which can be stored in the WDM system, an MUX unit 111 for multiplexing wavelengths, an AMP unit 112 for collectively amplifying a multiplexed optical signal, and an ATT unit 113 for adjusting the optical intensity of the transmitted optical signal. A reception unit 200 comprises an AMP unit 214 for amplifying a received wavelength division multiplex signal, a DMUX unit 215 for demultiplexing a wavelength division multiplex signal into each wavelength, and a transponder unit 216 for converting an optical signal into a client signal which is an electric signal.

In the transmission unit 100, the optical power of an optical signal whose wavelength has been converted by the transponder unit 110 is adjusted by a fixed or variable optical attenuator (ATT unit 113), and the signal is input to and multiplexed by the MUX unit 111. The wavelength division multiplex signal is collectively amplified by the AMP unit 112 for long-distance transmission. In the reception unit 200, the wavelength division multiplex signal is collectively amplified by the AMP unit 214 and demultiplexed by the DMUX unit 215 for each wavelength so that the signal can be converted into the optical power receivable by the transponder unit 16 when it is demultiplexed. Each wavelength-demultiplexed signal is converted by the transponder unit 216 into optical intensity and wavelength receivable by the client system.

FIGS. 2A through 2C are explanatory views of the operation modes of the AMP unit.

In the method for eliminating the effect of the change in number of wavelengths stored in a WDM system, the system of controlling the gain of the AMP unit has conventionally been operated by the ALC (automated constant control of output power: to maintain constant total output power) in a normal operation, and the gain control of the AMP unit is switched to the AGC (automated constant control of gain) when the number of wavelengths is changed. In this system, even if the number of wavelengths is changed, the optical levels of other wavelengths are not changed at a speed at which the gain control of the AMP unit 112 can be sufficiently performed. Therefore, the transmitting process is not affected.

That is, in the WDM system, the ATT unit controls the optical power of each wavelength input to the AMP unit 112 to be constantly maintained. Therefore, in the ALC mode shown in FIG. 2A, the output power is constant, and the optical power of each wavelength is also constant. That is, since the optical power is controlled to be constant regardless of the input power, the power of a wavelength output from the AMP unit 112 can be controlled. Furthermore, since control is performed with a target value of output power so that constant output power of the entire wavelengths can be maintained, the error of the optical power per wavelength is very small. The operation of the ALC mode is expressed by the following equation output power per wave(dBm)=(entire output power)−(10×log(number of wavelengths)

Since the amplification rate is constant in the AGC mode shown in 2B, the optical power of each wavelength relates to the input power only. That is, output power of wavelength(dBm)=(input power of wavelength)+amplification rate(dB)

When control to maintain a constant amplification rate is not performed with a target value of output power per wavelength, the output power per wavelength generates an error after a long time period.

Therefore, as shown in FIG. 2C, the AMP unit 112 normally operates in the ALC mode, and enters the AGC mode when there arises a change in the number of wavelengths, etc. When the change in the number of wavelengths is stopped, it enters back into the ALC mode.

Therefore, it is added or removed with an optical attenuator provided before a signal is multiplexed such that the AGC control can sufficiently work when a wavelength is added or removed. As a result, even if light is suddenly inputted, the optical attenuator can reduce it down to an ignorable level. When a wavelength is added or removed, the amount of attenuation can be stepwise adjusted, thereby suppressing optical fluctuation at a speed acceptable by the gain control by the AMP unit 112.

However, in the conventional method, when a wavelength is added or removed according to the intention of the operator of the system, the number of wavelengths can be changed without the influence on the other wavelengths. However, when the input to the AMP unit suddenly changes such as when a wavelength is suddenly lost, etc., there is a possibility that other wavelengths are affected because the changing speed of the wavelength is not slow.

FIG. 3 is an explanatory view showing the problem with the prior art.

Since the lowest level of the optical reception of the power of the output of the AMP unit 112 is determined for longer-distance transmission without a relay device, it is desired that higher output can be obtained on the transmission side. However, when the power per wavelength of the optical input to an optical fiber is high in the transmission system of the WDM technology, the optical nonlinear effect generates interference between wavelengths after the transmission of the optical fiber, thereby affecting the other wavelengths. Therefore, it is common that the power per wavelength is to be restricted on the optical fiber input side. When a wavelength is added or removed according to the intention of the operator, the optical nonlinear effect can be suppressed by controlling the input power per wavelength from the AMP unit 112 to the optical fiber by changing the gain control of the AMP unit 112 in the process of ALC (normal operation)→AGC (addition or removal of a wavelength)→ALC (normal operation). For example, when the input power to the AMP unit 112 suddenly decreases due to the disconnection of a wavelength by a fault of the transponder unit 110, etc., the number of wavelengths changes in the ALC mode during the time lag in the transition of modes even if the gain control is switched from the ALC to the AGC using any means. As a result, the optical power per wavelength appears large (in FIG. 3, a signal disconnection occurs in the dotted line portion, and the optical power of the other wavelengths is higher), and the optical nonlinear effect has an influence on the wavelengths in the operation. Actually, there is an optical margin to some extent in the system. Therefore, the nonlinear phenomenon does not occur from the fluctuation of one or two wavelengths. However, for example, if a fault affecting a number of wavelengths occurs in the system block before the AMP unit 112, and a large number of wavelengths are lost, then the level fluctuation in the remaining wavelengths refers not only to the fluctuation in the optical margin but also to the nonlinear phenomenon on the remaining wavelengths, and the remaining wavelengths are suffered an influence by the addition or removal of a wavelength.

The technology of removing the undesired influence of an optical signal disconnection is disclosed by the patent literature 1. In the patent literature 1, the power supply is duplexed so that an alarm signal for detection of a fault of the power supply is multiplexed with the main signal for transmission to the transmission line.

FIG. 4 shows, as an example of an occurrence of a conventional problem phenomenon, the fluctuation of the AMP output power when a WDM system operating with 40 wavelengths has lost its wavelengths down to 4 wavelengths by the failure of the transponder unit (TRP unit). In the AMP unit in which a wavelength is output at 3 dBm, control is performed such that 40 wavelengths are output at 19 dBm. Assume that the power supply of the transponder unit (TRP unit) suddenly becomes faulty and the device accommodating 36 wavelengths stops. Since 36 wavelengths are simultaneously stopped in this case, the light input to the MUX unit (that is, the light input to the AMP unit) has only 4 wavelengths in the ALC mode. The output of the AMP unit in this status is controlled to maintain the output at 19 dBm because it is operated in the ALC mode. That is, four wavelengths are output at 19 dBm, that is, the light is output from the AMP unit at 13 dBm per wavelength. This status continues until the AMP unit detects a lost wavelength. After the AMP unit detects the lost wavelength, it enters the AGC mode, the amplification rate indicates a standard value, and the output power per wavelength returns to the standard value. The time taken by the AMP unit to detect a lost wavelength from the fault of the TRP unit is several hundred ms through several seconds. However, when the optical power per wavelength suddenly increases, an undesired influence appears on the remaining wavelength due to the nonlinear phenomenon. The phenomenon similarly has an undesired influence on the remaining wavelengths when a wavelength interference occurs at a high speed at which the gain control cannot be performed even in the AGC mode.

SUMMARY OF THE INVENTION

The present invention aims at providing a wavelength division-multiplex system capable of performing optical communications without undesired influence on the remaining normal wavelengths when the input power to the optical amplifier suddenly changes.

The wavelength division-multiplex system according to the present invention includes a signal disconnection delay unit for giving different timings of stopping electrical power supplied to the modules that produce the optical signals when the power supplies to the modules are down on the transmission side in the wavelength division-multiplex system for multiplexing and transmitting an optical signal having a plurality of wavelengths.

According to the present invention, even if a power outage occurs, a number of wavelengths immediately enter an output stoppage a signal disconnection delay status because the signal disconnection delay unit gives different timings of stopping electrical power supplied to the modules that produce the optical signals. As a result, switch of an optical amplifier from the ALC to the AGC becomes impossible, so an undesired influence on an optical signal which has not stopped output can be avoided.

According to the present invention, even if the input power to the optical amplifier suddenly changes, normal optical communications can continue without undesired influence on the wavelengths other than a faulty wavelength.

BRIEF DESCRIPTION OF THE DRAWINGS

FIG. 1 shows the outline of the configuration of the transmission unit and the reception unit of the conventional WDM system;

FIG. 6 is an explanatory view showing the configuration in which the power-down delay unit is a capacitor according to the embodiment shown in FIG. 1;

FIG. 7 is an explanatory view of the power-down delay unit configured by a backup power supply and the power monitor device according to the embodiment shown in FIG. 5;

FIG. 10 shows an example of a variation of the configuration shown in FIG. 9;

FIG. 15 is an explanatory view (2) showing the configuration for detection and notification of power-down, etc. according to an embodiment of the present invention; and FIG. 16 shows an example of using the fault detecting method shown in FIG. 15.

DESCRIPTION OF THE PREFERRED EMBODIMENTS

Figure 2A:
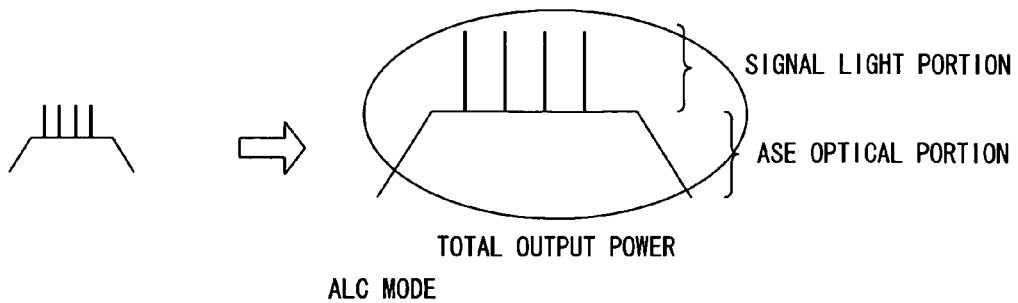
FIGS. 2A through 2C are explanatory views of the operation modes of the AMP unit.
Figure 2B:
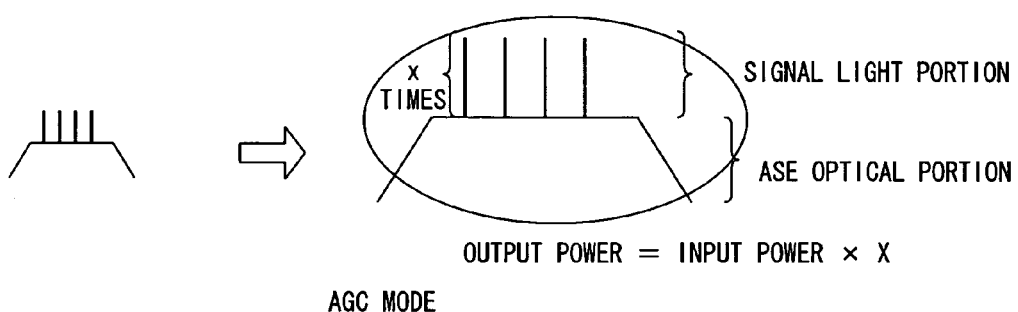
Figure 2C:
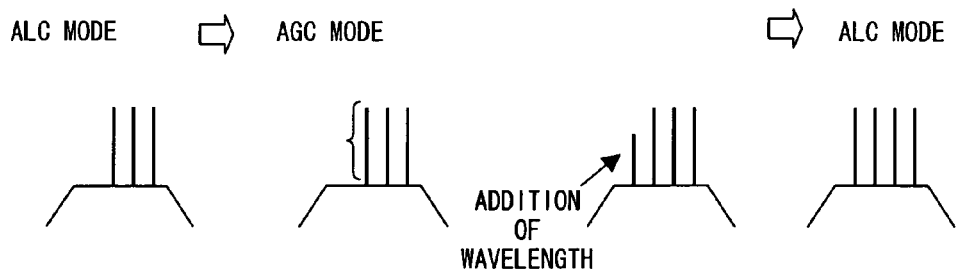
Figure 3:
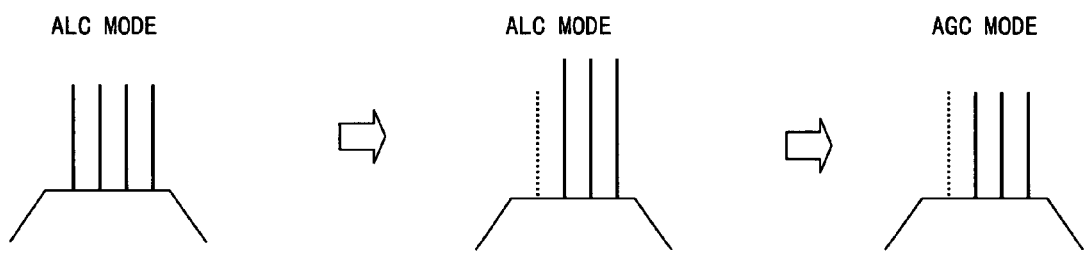
FIG. 3 is an explanatory view of the conventional problem.
Figure 4:
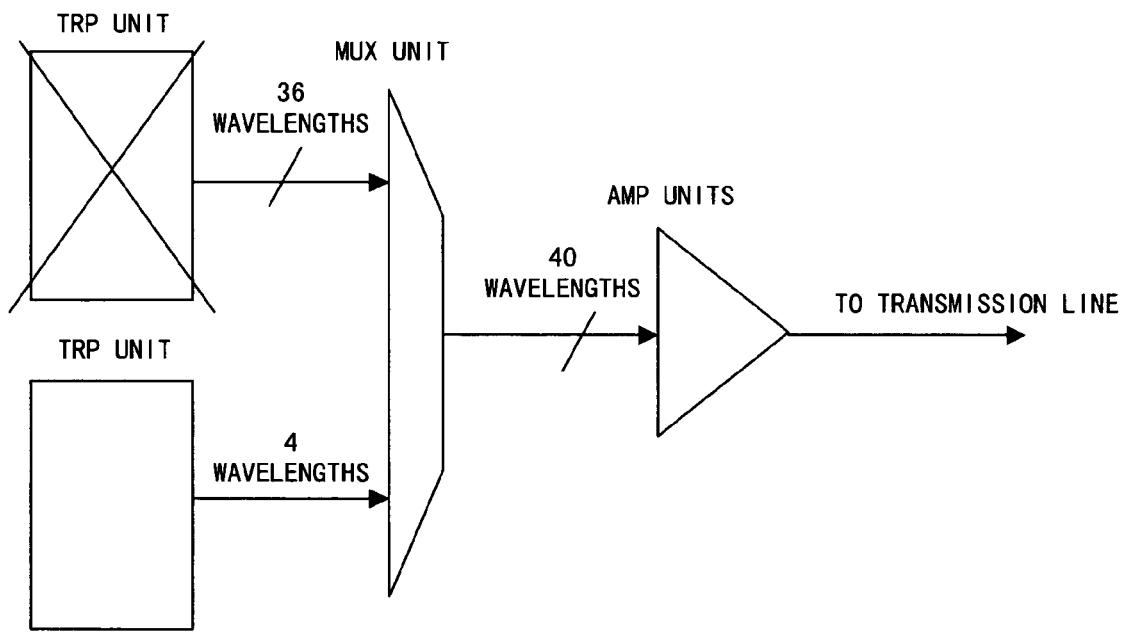
FIG. 4 shows the fluctuation of AMP output power when the number of wavelengths of the WDM system operating with 40 wavelengths has been reduced to four due to the fault of a transponder unit (TRP unit) as an example of a phenomenon of the conventional problem.

When a large number of wavelengths are suddenly lost, it is considered to have been caused by one of the following conditions because it is rare that a number of optical parts simultaneously become faulty.

The power supply of a transponder unit that supplies power to a plurality of LDs has become faulty.

When the ATT unit can be electrically controlled, a circuit block for supplying power to a plurality of ATT units becomes faulty.

The embodiments of the present invention are explained below by referring to the attached drawings, and similar components are assigned the same reference numerals.

Figure 5:
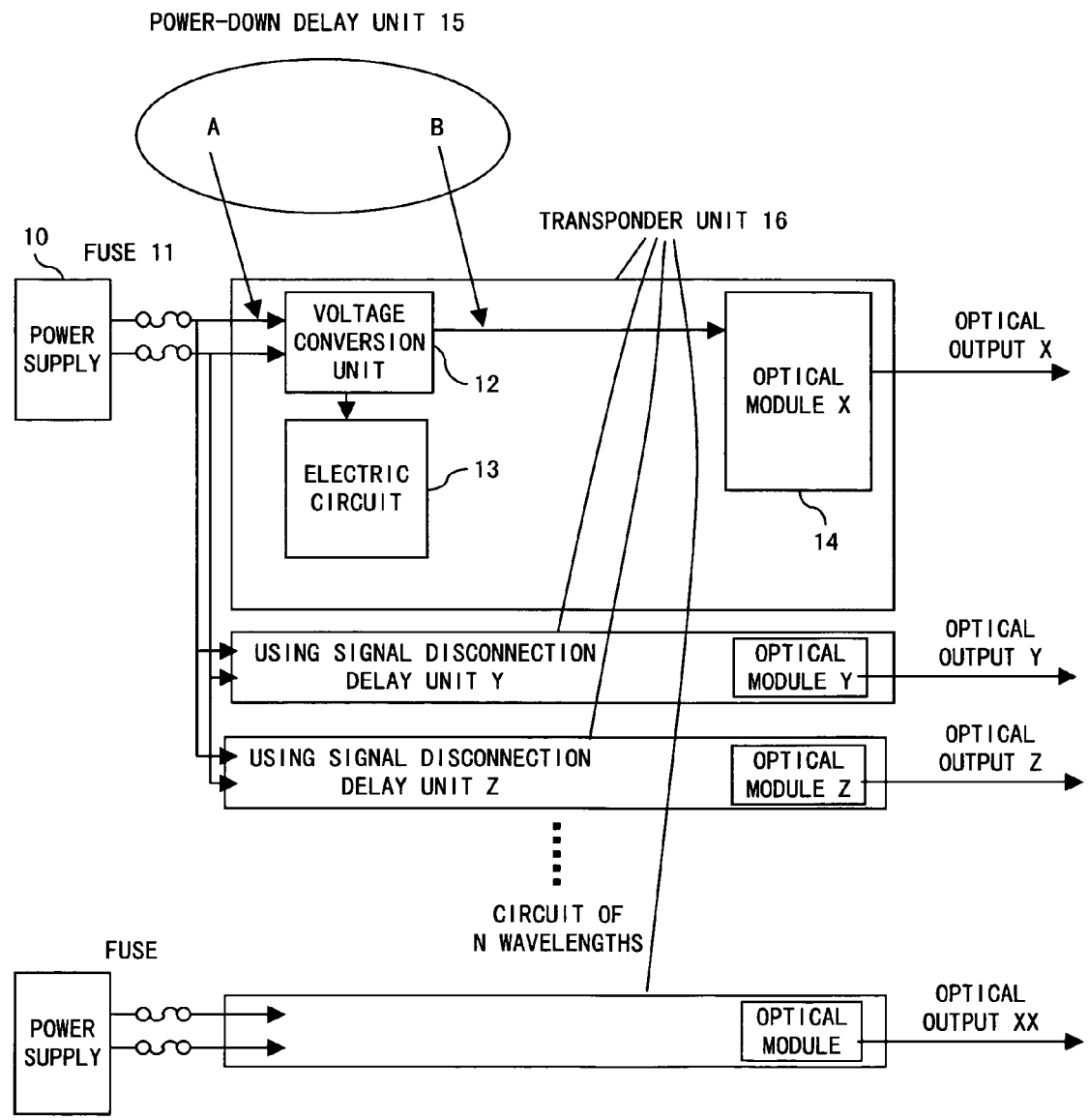
FIG. 5 is an explanatory view showing the outline of an embodiment of the present invention.

FIG. 5 shows the outline of the embodiment of the present invention.

In FIG. 5, a power supply 10 supplies electric power to each unit of the transmission unit, and is normally duplexed. A voltage conversion unit 12 converts the voltage supplied from the power supply 10 into a voltage appropriate for each circuit and supplies the converted voltage. An electric circuit unit 13 controls transponder unit 16, and an optical module 14 generates and transmits an optical signal of each wavelength.

The main power supply 10 which supplies power to each voltage conversion unit 12 is normally duplexed. However, when both systems become faulty, the output stoppage time of each of the faulty units is not considered in case of the fault of the power supply with the conventional configuration. Therefore, the optical output to be output from the portion originating the fault also stops. According to the embodiment of the present invention, to prevent the simultaneous output stoppage of the optical output under the power supply 10, a different power-down delay unit 15 is used so that the output stoppage for each wavelength can be differentiated in timing.

That is, in FIG. 5, assume that the power-down delay unit 15 is inserted into the position of A or B, and a fault of no power voltage supply simultaneously to the optical modules X, Y, and Z occurs. At this time, the optical modules X, Y, and Z are provided with the respective power supply delay units having different output stoppage delay time so that the output stops after the time X at the optical output X, the output stops after the time Y at the optical output Y, and the output stops after the time Z at the optical output Z. Thus, for each wavelength, the stop time of optical output is different, and the decrease of the input light to the AMP unit becomes slow. Therefore, an optical signal whose optical output XX at the portion where no fault of power supply occurs does not have an influence of the occurrence of a nonlinear effect.

FIG. 6 is an explanatory view showing the configuration in which the power-down delay unit is a capacitor in the embodiment shown in FIG. 1.

In FIG. 6, a capacitor is used as a power-down delay unit in the configuration of the transponder unit 16 in the WDM system.

When power supply is simultaneously disconnected, the power is supplied to an optical module 14' for outputting light of each wavelength for a time depending on the capacity of the capacitors X, Y, and Z (capacitor 15'), and the output of the laser of the optical module 14' is stopped depending on the capacity of the capacitor. The difference in stop time depending on the wavelength prevents the wavelengths from being simultaneously disconnected.

That is, assume that power is not supplied to a laser of the E/O unit 14' of each wavelength of the transponder unit 16 by providing a capacitor (capacity X/Y/Z) 15' having a different capacity for each wavelength in the position of A or B, and when the power supply 10 and a fuse 11 become faulty in the two systems of the redundant configuration, the power supply time to the laser is different because the electric charge stored in the capacitor 15' is different for each wavelength block. Therefore, the optical output X stops after time X, the optical output Y stops after time Y, the optical output Z stops after time Z.

FIG. 7 is an explanatory view of the power-down delay unit configured by a backup power supply and a power monitor device according to the embodiment shown in FIG. 5.

In FIG. 7, with the configuration of the transponder unit 16 of the WDM system, a backup power supply 20 is used as a power-down delay unit.

The method for providing a time difference in laser output stoppage in FIG. 7 is described below. When there occurs a fault in two systems of the power supply 10 which supplies power to the transponder unit 16 and fuse 11, the power monitor device 21 detects that the power to be supplied has been disconnected, and automatically switches to the backup power supply 20. When the power supply is switched to the backup power supply 20, the power monitor device 21 issues an instruction to stop laser output individually to the laser under the backup power supply 20 at predetermined intervals. According to the instruction, the time of output stoppage for each wavelength can be different. That is, although the AMP unit connected to the transponder unit 16 according to the present embodiment enters a state in which a number of wavelengths are disconnected due to the power supply fault of the transponder unit 16, there is still time taken to enter the AGC after a wavelength is disconnected when viewed from the AMP unit, and then each wavelength is disconnected with the timing allowing gain control to be performed, thereby eliminating the influence of the nonlinear effect on the circuit of the transponder unit 16 which is currently free of a power supply fault.

Figure 8:
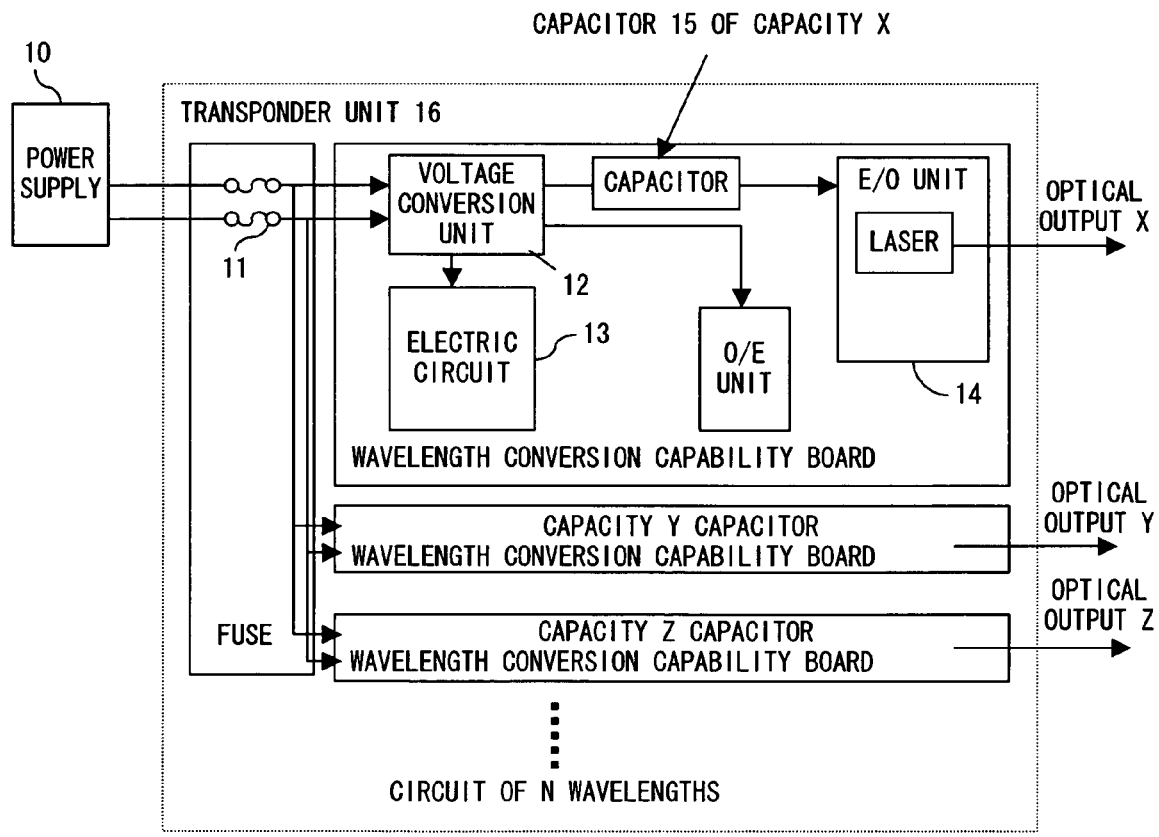
FIG. 8 is an explanatory view showing the configuration in which a capacitor as a power-down delay unit is provided between the voltage conversion unit and the optical module.

FIG. 8 is an explanatory view of the configuration in which a capacitor as a power-down delay unit is provided between the voltage conversion unit 12 and the optical module (a capacitor is provided in the position of B shown in FIG. 6).

With the configuration of the transponder unit 16 of the WDM system, a capacitor 15 is individually inserted for each wavelength (each board) in the position of the power supply line for the optical module (E/O unit) 14 on the board realizing the capability of conversion into each wavelength. When a fault in the power supply 10 occurs, the power is supplied to the optical module 14 for a time depending on the capacity of the capacitor 15 individually provided on each board after the power supply from the power supply 10 is disconnected. When the electric charge of the power-down delay unit 15 disappears, the laser of the optical module 14 stops output. Since the stop time depends on the board, each wavelength is prevented from being simultaneously disconnected.

Figure 9:
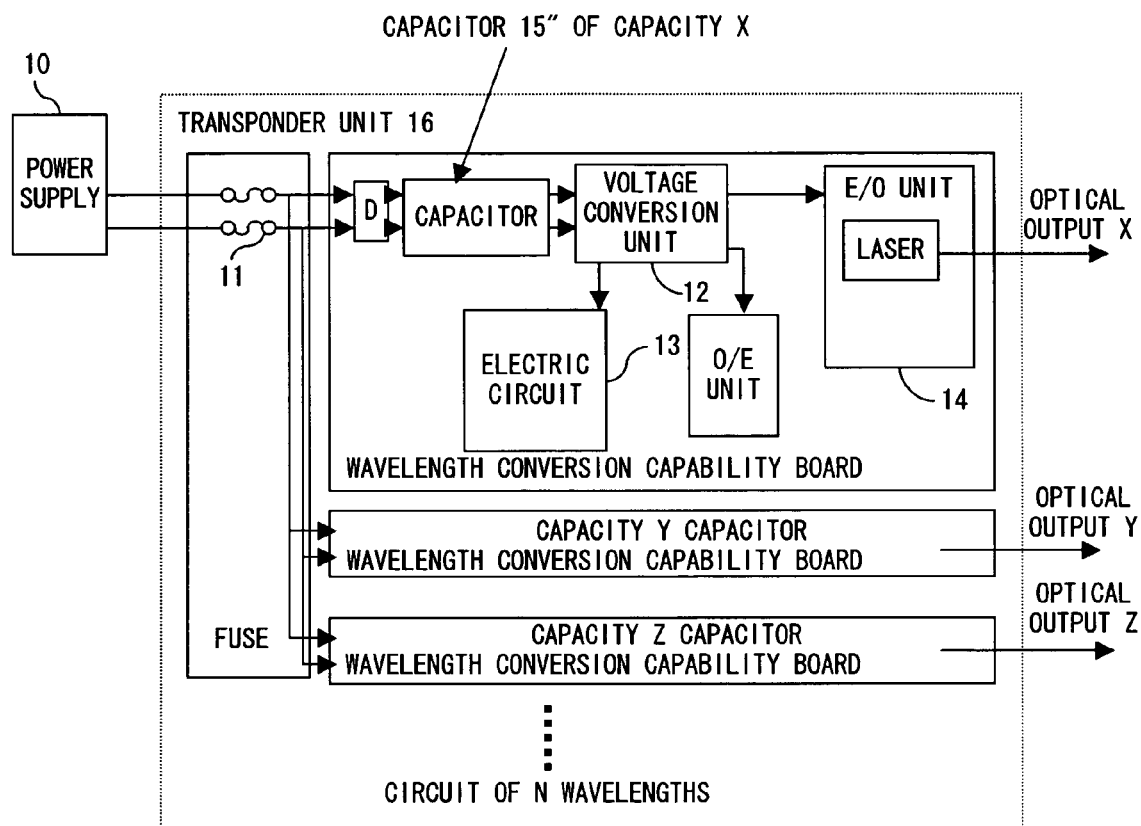
FIG. 9 is an explanatory view showing the configuration in which a capacitor as a power-down delay unit is provided between the fuse and the voltage conversion unit.

FIG. 9 is an explanatory view showing the configuration in which a capacitor as a power-down delay unit is provided between the fuse and the voltage conversion unit (the capacitor is provided at A shown in FIG. 6).

With the configuration of the transponder unit 16 in the WDM system, an individual capacitor 15" is inserted for each wavelength (each board) in the position of the power supply line to the voltage conversion unit 12 on the board realizing the capability of conversion into each wavelength. When a fault occurs in the power supply 10, the board continues its operation for the electric charge stored in the capacitor 15" with the power supplied to the voltage conversion unit 12 for a time depending on the capacity of the capacitor 15" individually provided on each board after the power supply stops from the power supply 10. When the capacity of the capacitor 15" is exhausted, the operation of the board stops, thereby stopping the output of the laser of the optical module 14. The stop time is different among boards, thus preventing the simultaneous disconnection of each wavelength.

With the configuration shown in FIG. 9, a diode D is provided on the side of the fuse 11 of the capacitor 15" so that the current can be protected against flowing in the direction toward the power supply 10 when the capacitor 15" is discharged.

FIG. 10 shows an example of a variation of the configuration shown in FIG. 9.

With the configuration of the transponder unit 16 in the WDM system, a capacitor 15" having a different value is inserted for each slot (connecting the wiring to each wavelength conversion capability board) in the position of the power supply line of the connector (back board 30) connecting a board 31 realizing the capability of conversion into each wavelength. With the arrangement, it looks as if a capacitor having a different capacity for each board were inserted. When a fault occurs in the power supply 10, the power is supplied to the voltage conversion unit 12 for a time depending on the capacity of the capacitor 15" connected to each board 31 on the back board 30 after the power supply from the power supply 10 is exhausted, and the board 31 continues the operation for the electric charge stored in the capacitor 15". When the capacity of the capacitor 15" is exhausted, the operation of the board 31 stops. As a result, the laser of the optical module stops output. Since the stop time depends on the board 31, each wavelength can be prevented from being simultaneously disconnected. As shown in FIG. 5, an inverse current protection diode D is provided before the capacitor 15" as shown in FIG. 9.

Figure 11:
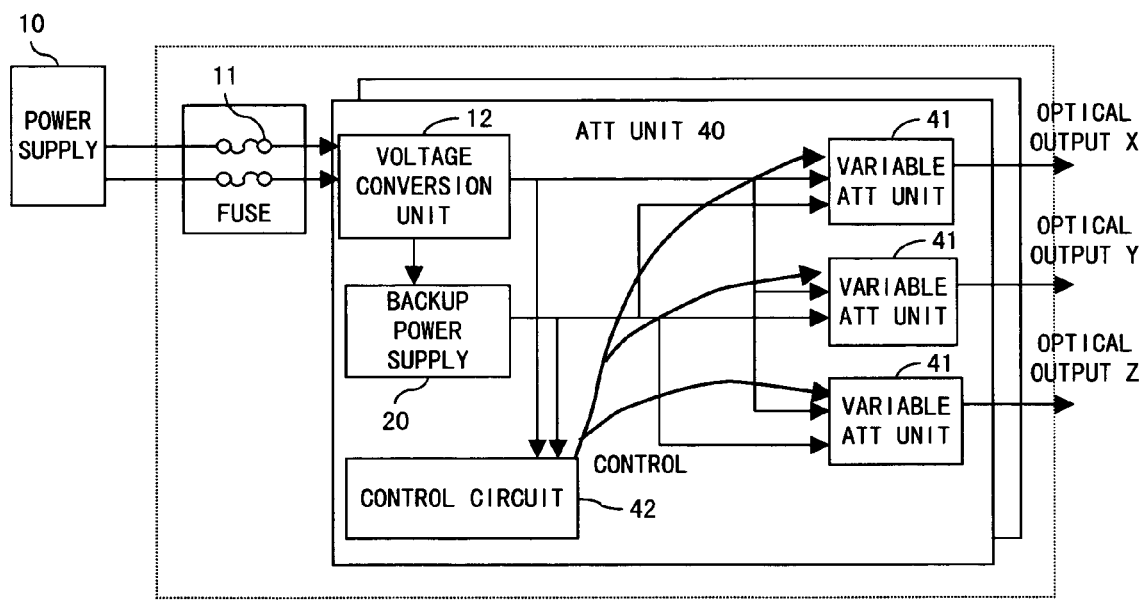
FIG. 11 shows another embodiment (1) of the present invention.
Figure 12:
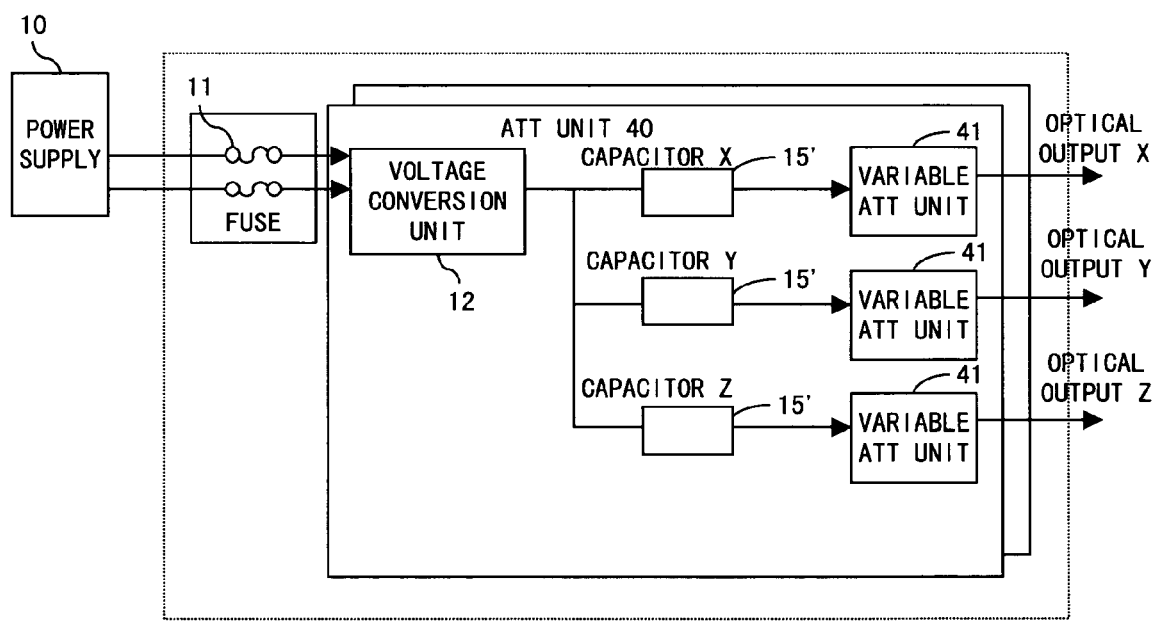
FIG. 12 shows a further embodiment (2) of the present invention.

FIGS. 11 and 12 show other embodiments according to the present invention.

With the configuration in which a variable ATT unit 41 is controlled and used as an ATT unit 40 of the WDM system, the capacitor 151 or the backup power supply 20 is used as a power-down delay unit in the variable ATT block 41.

When the power supply is disconnected to the variable ATT unit 41 due to a fault of the power supply 10, disconnections to the fuse 11 in the two systems, or the fault of the voltage conversion unit 12 for supplying power to a number of variable ATT units, the variable ATT unit 41 has the largest or smallest amount of attenuation based on its characteristic. When the amount of attenuation is the largest, the ATT unit 40 connected to the faulty power supply system is either controlled using the backup power supply 20 or changed in stop time for optical output for each wavelength by the capacitor 15' having a different value for each wavelength, thereby it is able to prevent simultaneous disconnection of each wavelength. On the other hand, when the amount of attenuation is the smallest, the ATT unit 40 connected to the faulty power supply system is either controlled using the backup power supply 20 or using the ATT unit 40 by the capacitor 15' having a different value for each wavelength to stop output at a different time, thereby it is able to prevent a simultaneous disconnection of each wavelength (output stoppage is not performed by the ATT unit 40, but by a shutter having an activation device when the amount of attenuation of the variable ATT unit 41 is the smallest). When the backup power supply 20 controls the unit as shown in FIG. 11, a control circuit 42 is provided, and control is performed such that the amount of attenuation can be the largest at a different time, and the transmission of an optical signal can be stopped.

Figure 13:
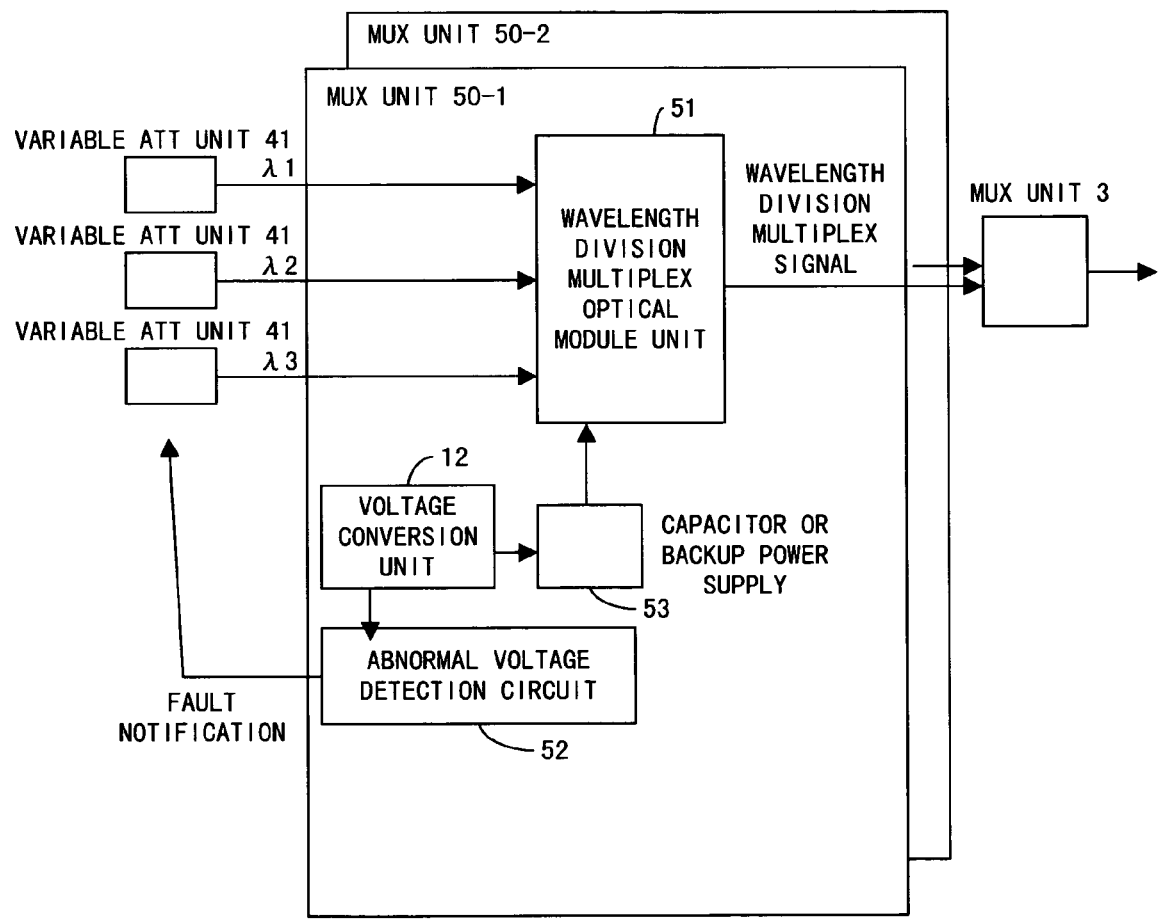
FIG. 13 shows a further embodiment (3) of the present invention.

FIG. 13 shows another embodiment of the present invention.

With the configuration in which each wavelength is function divided for each wavelength group as MUX units 50-1 and 50-2 in the WDM system, a capacitor or a backup power supply is used as a power supply delay unit 53 in the MUX units 50-1 and 50-2.

If the power supply to an optical module unit 51 configuring the MUX units 50-1 and 50-2 is disconnected due to a fault of a power supply or disconnections of fuses in two systems, then the wavelength passing through the optical module unit 51 of the MUX units 50-1 and 50-2 changes. Therefore, by preventing an abnormal status in the optical output of a module for a predetermined time by backup power supply or a capacitor connected to the power supply system to the module, and notifying the ATT unit of the failure of the power supply systems of the MUX units 50-1 and 50-2, the variable ATT unit 41 for controlling the corresponding wavelength gradually stops the output so as not to suddenly decrease the input to the AMP unit. The power supply of the MUX units 50-1 and 50-2 can be controlled to have no influence on the wavelength belonging to the MUX units 50-1 and 50-2 having no faults in the power supply system so far as the MUX units 50-1 and 50-2 are normal until the optical ATT unit gradually stops output.

To notify the variable ATT unit 41 of a fault, a abnormal voltage detection circuit 52 for monitoring the power supply voltage from the voltage conversion unit 12 is provided for the MUX units 50-1 and 50-2.

Figure 14:
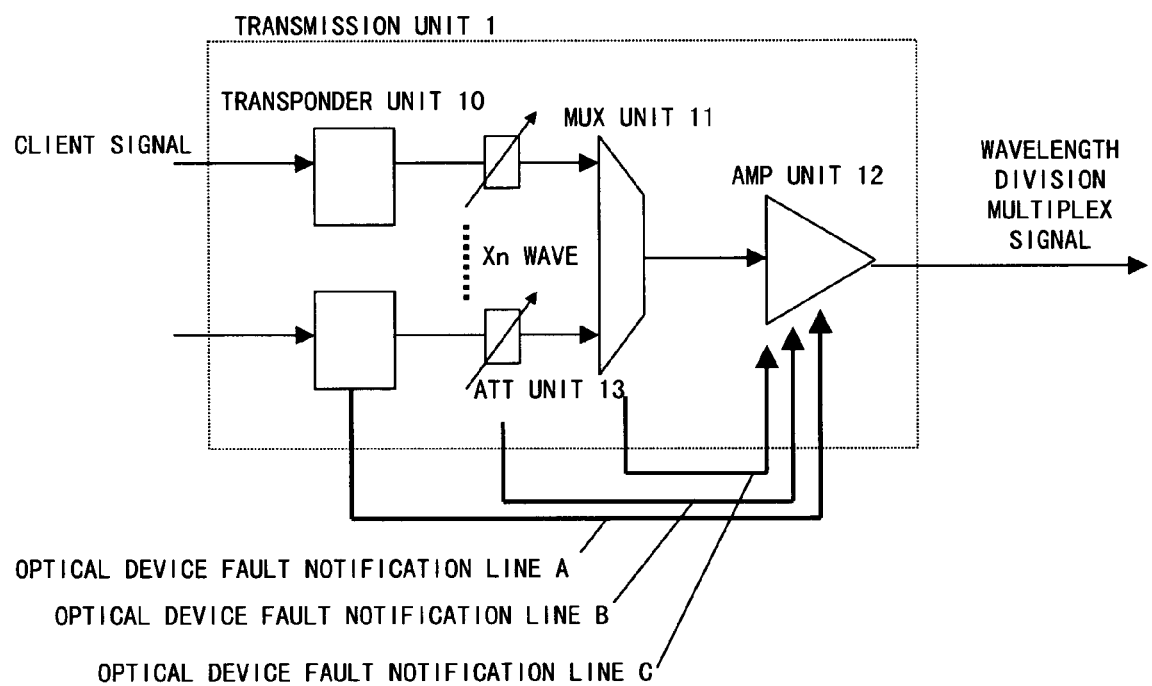
FIG. 14 is an explanatory view (1) showing the configuration for detection and notification of power-down, etc. according to an embodiment of the present invention.

FIGS. 14 and 15 are explanatory views of the configuration for detection and notification of a disconnection of the power supply, etc. according to an embodiment of the present invention.

When the optical input power of the voltage conversion unit 12 of the WDM system is changed, it is necessary to moderate the optical change until the AGC mode is entered so that a sudden decrease in the number of wavelengths can be appropriately processed in the ALC mode of the voltage conversion unit 12. Correspondingly, it is also necessary to provide a unit for notifying the AMP unit 12 that the power supply to the optical module which is a trigger of a change to the AGC mode has been disconnected.

FIG. 14 is a block diagram showing the configuration of the transmission unit 1 of the WDM system. An optical signal is wavelength-converted by the transponder unit 10, adjusted by the ATT unit 13 into the optimum power, wavelength multiplexed by the MUX unit 11, and then collectively amplified by the AMP unit 12. The power supply faults other than in the AMP unit 12 are not to have an influence on anything but an optical wavelength related to a faulty portion. When a power supply system of a wavelength in the transponder unit 10 becomes faulty, the fault is transmitted to the AMP unit 12 through an optical device fault notification line A. The AMP unit 12 enters the AGC mode. When the power supply system of a wavelength of the ATT unit becomes faulty, the fault is transmitted to the AMP unit 12 through a optical device fault notification line B. The AMP unit 12 enters the AGC mode. When the power supply system of a wavelength of the ATT unit 13 becomes faulty, the fault is transmitted to the MUX unit 11 through an optical device fault notification line C. The AMP unit 12 enters the AGC mode.

In FIG. 15, an optical signal is wavelength-converted by the transponder unit 10, adjusted by the ATT unit 13 into the optimum power, wavelength multiplexed by the MUX unit 11, and then collectively amplified by the AMP unit 12. T-1 shown in FIG. 15 refers to a voltage conversion unit, T-2 refers to a power-down delay unit, T-3 through T-7 refer to optical modules of the transponder unit 10, A-1 through A-5 refer to an optical attenuator for wavelength λn(n=1~5), M-1 through M-7 refer to optical input detection units of the MUX unit 11. When a power supply system of a wavelength of the transponder unit 10 becomes faulty, the power supply of the optical modules T-3 through T-7 of the transponder unit 10 stops, thereby stopping the output. Upon notification of the output stoppage, the ATT unit 13 detects an optical input disconnection, and the detection notification is transmitted to the AMP unit 12 through an optical input disconnection detection line. The AMP unit 12 is informed of the reduction of the wavelengths. Therefore, the AMP unit 12 enters the AGC mode. When a power supply system of a wavelength of the ATT unit 13 becomes faulty, an optical input disconnection is detected by the MUX unit 11, and the detection notification is transmitted to the AMP unit 12 through the optical input disconnection detection line, and then to the AMP unit 12. The AMP unit 12 enters the AGC mode.

FIG. 16 shows an embodiment in which the fault detecting method shown in FIG. 15 is used.

The fault detecting method shown in FIG. 15 is not only applied to the present embodiment, but also applied to the above-mentioned embodiments.

The reference numerals shown in FIG. 16 are the same as those shown in FIG. 15.

When a power supply fault of the WDM system is detected by a change in the optical level monitor provided in the subsequent stage, a power supply fault of only one wavelength is directly set as a signal disconnection, and other wavelengths can be controlled to emit optical power until the AGC mode can be entered using the power supply delay unit. That is, the power-down delay unit is inserted to the transponder unit 10 or the ATT unit 13, but the power-down delay unit is not inserted to some wavelengths, and the power supply delay unit is inserted to other wavelengths.

In the voltage conversion unit T-1, power supply to the system is converted into power supply for use in the system, and the power supply is directly connected to the optical module T-3 without the power-down delay unit T-2 only for a certain wavelength. When a power supply fault, etc. occurs in the transponder unit 10 and the power supply to the optical modules T-3 through T-7 of the transponder unit 10 is disconnected, the output of the optical module T-3 to which the power-down delay unit T-2 is not inserted is first stopped. The optical output continues to other optical modules T-4 through T-7 because the power-down delay unit T-2 operates. At the ATT unit 13, after the optical input of one wavelength is lost, the notification is transmitted to the AMP unit 12 through the optical input disconnection detection line. Upon receipt of the notification, the AMP unit 12 enters the AGC mode. After entering the AGC mode, the power-down delay unit T-2 of the transponder unit 10 completes the operation, and the remaining wavelengths are sequentially disconnected. In this method, the reduction of the wavelengths can be announced to the AMP unit 12 before occurring a sudden drop in the input optical power to the AMP unit 12. Therefore, the optical input to the AMP unit 12 is not suddenly decreased when in the ALC mode, thereby having no influence on the wavelength in which no fault is detected, and correctly controlling the change of the AMP unit 12 into the AGC mode. The method of not inserting the power-down delay unit T-2 to only one wavelength can be applied not only to the transponder unit 10 but also to the ATT unit 13.

What is claimed is:

1. A WDM system which multiplexes a plurality of optical signals having different wavelengths and which are respectively produced by a plurality of modules when the plurality of modules receive a supply of power from a power source, and then transmits a multiplex signal obtained by said multiplexing, the WDM system comprising:
a delay unit including capacitors that store electrical charge while the supply of power from the power source is being received by the plurality of modules,
wherein, when the supply of power from the power source is stopped, the delay unit discharges the capacitors so that the supply of power received by the plurality of modules is stopped at a plurality of different timings, respectively.

2. The system according to claim 1, wherein the delay unit is provided in power supply lines to the modules.

3. The system according to claim 1, wherein the modules are transponders converting electric signals into the optical signals, and the delay unit is provided between the power source and the modules.

4. The system according to claim 1, wherein
a plurality of boards accommodate a plurality of processing devices, respectively, for producing the plurality of optical signals, respectively, and
the delay unit is provided in a power supply line on a back board accommodating the plurality of boards.

5. The system according to claim 1, wherein said delay unit is provided in an optical attenuator unit, an optical wavelength division multiplexing unit, or a transponder unit.

6. The system according to claim 1, wherein said delay unit comprises a capacitor or a circuit for controlling a standby power supply and supply of electric power.

7. The system according to claim 1, wherein when power disconnection which causes a signal disconnection is detected, a detection notification is transmitted to an optical amplifier through a dedicated line.

8. The system according to claim 1, wherein a delay unit is not provided for one wavelength in a transmitter of wavelengths to be wavelength-multiplexed.

9. The system according to claim 1, wherein
the multiplexed signal is amplified by an optical amplifier, and
each of the plurality of different timings is longer than a time for the optical amplifier entering from an ALC mode to an AGC mode, and allows gain control of the optical amplifier.

10. A method for use with a WDM system which multiplexes a plurality of optical signals having different wavelengths and which are respectively produced by a plurality of modules when the plurality of modules receive a supply of power from a power source, and then transmits a multiplex signal obtained said multiplexing, comprising:
charging capacitors that store electrical charges while the supply of power from the power source is being received by the plurality of modules; and
when the supply of power from the power source is stopped, discharging the capacitors so that the supply of power received by the plurality of modules is stopped at a plurality of different timings, respectively.

11. An apparatus comprising:
a power supply supplying power;
a plurality of modules that, when receiving a supply of power from the power supply, produces a plurality of optical signals, respectively, at different wavelengths from each other in accordance with the received supply of power;
a multiplexer that multiplexes the plurality of optical signals into a wavelength division multiplexed (WDM) optical signal; and
a delay unit that, when the supply of power from the power supply is stopped, causes the supply of power received by the plurality of modules to be stopped at a plurality of different timings, respectively:
wherein the delay unit comprises capacitors that store charge from the supply of power from the power supply when the supply of power from the power supply is being received by the plurality of modules, and that are discharged when the supply of power from the power supply is stopped to thereby provide the plurality of different timings.

12. An apparatus as in claim 11, further comprising:

an optical amplifier amplifying the WDM optical signal, wherein the optical amplifier amplifies the WDM optical signal with automatic level control (ALC) when the number of optical signals at different wavelengths multiplexed in the WDM optical signal are not being changed, and amplifies the WDM optical signal with automatic gain control (AGO) when the number of optical signals at different wavelengths multiplexed in the WDM optical signal are being changed, and the plurality of different timings provide sufficient time for the optical amplifier to enter the AGO from the ALC upon the number of optical signals at different wavelengths being changed due to the plurality of modules having stopped receiving the supply of power from the cower supply.

* * * * *

UNITED STATES PATENT AND TRADEMARK OFFICE
CERTIFICATE OF CORRECTION

PATENT NO. : 7,623,794 B2  Page 1 of 1
APPLICATION NO. : 10/895307
DATED : November 24, 2009
INVENTOR(S) : Makoto Takakuwa et al.

It is certified that error appears in the above-identified patent and that said Letters Patent is hereby corrected as shown below:

Column 12, Line 2, change "(AGO)" to --(AGC)--.

Column 12, Line 6, change "AGO" to --AGC--.

Column 12, Line 10, change "cower" to --power--.

Signed and Sealed this

Second Day of February, 2010

David J. Kappos
*Director of the United States Patent and Trademark Office*